United States Patent Office 3,449,260
Patented June 10, 1969

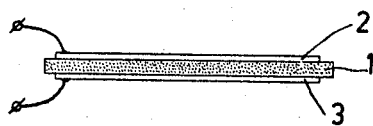

3,449,260
ELECTROLUMINESCENT SCREEN COMPOSITION
Henri Hubert Janssens, Willem Westerveld, and Louis Marius Nijland, Emmasingel, Eindhoven, Netherlands, assignors, by mesne assignments, to U.S. Philips Corporation, New York, N.Y., a corporation of Delaware
Filed Aug. 10, 1965, Ser. No. 478,711
Claims priority, application Netherlands, Aug. 12, 1964, 6409255
Int. Cl. C09k 1/12; H01j 1/63
U.S. Cl. 252—301.6    5 Claims

ABSTRACT OF THE DISCLOSURE

An electroluminescent element containing as the electroluminescent layer electroluminescent phosphor grains dispersed in antimony oxide. An example of the phosphor is copper activated zinc sulfide. The electroluminescent elements of the invention show a marked decrease in the decay of the luminescence.

---

The invention relates to an electroluminescent element comprising an electroluminescent layer sandwiched between two electrodes and consisting of the dispersion of an electroluminescent substance in a solid medium. Furthermore the invention relates to a method of manufacturing such an element.

Electroluminescent elements consist, as is known, of an electroluminescent substance sandwiched between two electrodes and emitting radiation upon the application of a voltage, usually an alternating voltage between the electrodes. The best known electroluminescent substance, which may also be employed in elements according to the invention, is copper-activated zinc sulphide.

The construction of the elements may be different, but almost invariably one of the electrodes is permeable for the radiation to be emitted by the electroluminescent substances. Usually the element comprises a rigid support which may consist of glass or metal.

The electroluminescent substance is usually not arranged as such between the electrodes, but in the form of a dispersion in a solid medium. This medium may be a glass or it may consist of some suitable synthetic resin. If use is made of a glass support, it is common practice to provide said support with a transparent electrode for example of conductive tin oxide. The other electrode need not be transparent and may consist of a metal layer obtained by vapour deposition or of a metal layer applied by means of a binder. In order to improve the luminance and to raise the break-down voltage of the elements an additional layer preferably consisting of titanium dioxide or a titanate of an alkaline-earth metal is often arranged between the electroluminescent layer and the opaque electrode.

It is known that the properties of an electroluminescent element are highly affected by the composition of the electroluminescent layer. Of course, it is very important that the electroluminescent substance itself should have a high conversion efficiency. The composition of the medium in which the electroluminescent substance is dispersed, is, however, found to be of equal importance. Particularly, the lifetime and the luminous efficiency after a given number of operational hours are strongly influenced by the medium. Therefore, the literature gives many different formulae for the composition of the medium and for the manufacture of the electroluminescent layer.

The object of the invention is to ensure a smaller decay of the luminance of the element during use by a suitable choice of the composition and of the application of the medium, so that at the same time the useful lifetime is prolonged.

An electroluminescent element according to the invention contains an electroluminescent layer sandwiched between two electrodes and consisting of the dispersion of an electroluminescent substance in a solid medium and is characterized in that the medium consists of antimony oxide which forms an uninterrupted layer by heating it above its melting point and by subsequent cooling.

As stated above, it is known to choose a glass-like material for the medium of the electroluminescent layer. The antimony oxide, which alone forms the medium in accordance with the invention, may be considered to be a glass-like material. There are already known kinds of glass for use as a medium, containing a given percentage of antimony oxide. In general, this percentage is fairly small and never higher than 50% of the overall weight of the medium.

As in the manufacture of known elements having a glass-like medium, the electroluminescent substance of an element according to the invention, for example copper-activated zinc sulphide is mixed with the antimony oxide and the electroluminescent layer is formed by subsequent heating. Heating is usually carried out after the mixture has been applied to a support, particularly a metal suport. According to the invention use may be made, like with other known elements, of a binder. The binder is chosen so that it disappears during heating without leaving disturbing residues.

It has been found that the electroluminescent material may amount from 60 to 98% by volume of the total volume of the electroluminescent layer. With the elements hitherto known the quantity of electroluminescent material is only 15 to 40% by volume of the glass-like part of the electroluminescent layer. Owing to said larger quantity of electroluminescent material in the electroluminescent layer the luminance is higher than that of the known elements. With the very great quantities of electroluminescent material that may be employed and with the comparatively small quantity of antimony oxide it has been found to be desirable for the average grain size of the electroluminescent material to lie between 5 and 10μ.

Although, as stated above, heating is always performed at a temperature exceeding the melting point of the antimony oxide, it is not certain that the whole quantity of antimony oxide is melted. This depends, of course, upon the duration of heating. It has been found that a short duration of heating at a higher temperature provides higher initial values of the luminance of the final electroluminescent element. Therefore, heating is preferably carried out at a temperature exceeding by 20° C. to 60° C. the melting point of antimony oxide. The duration of heating is preferably chosen between 3 and 8 minutes; with a longer period of heating there is the risk of chemical reaction between the antimony oxide and the electroluminescent material. After heating the medium may have obtained its coherence partly by sintering, that is to say by superficial melting and adhesion of the antimony oxide particles to each other.

When an electroluminescent element according to the invention is connected to an electric alternating voltage, its luminance decreases with time and this the more rapidly, the higher the frequency of the alternating voltage. With the elements according to the invention this decay is, however, considerably smaller than with the elements hitherto known. The smaller the decay, the longer the element remains practically employable. An element which has a lower luminance immediately after its manufacture than a known element must be considered to be better, if after a given number of operational hours it displays a smaller decay than the known element such that it then has a higher luminance.

The invention will now be explained with reference to a few examples.

An electroluminescent element according to the invention is manufactured, for example, by applying first a layer of titanium dioxide contained in a glass-like medium with a thickness of about 100μ to a ferrochromium support which afterwards serves as the opaque electrode, to which layer is applied a mixture of antimony trioxide and copper-activated zinc sulphide. The binder added to this mixture may be a small percentage of polyvinylacetate, for example 0.5 to 10% by weight of the dry mixture. After the application of this mixture the support with the layers applied thereto is preheated for 20 to 50 minutes in order to remove the binder, after which it is heated for 3 minutes in a furnace at a temperature which just exceeds the melting point of the antimony trioxide, i.e. 656° C. During this heating process an uninterrupted, glass-like electroluminescent layer is formed. The second electrode is then applied to the resultant electroluminescent layer, said electrode consisting of transparent, conductive tin oxide. This may be performed by spraying tin chloride onto the heated element.

It should not be considered as excluded that during the heating of the element the antimony trioxide is converted at least partly into an antimony oxide in which the antimony has a higher valency.

For comparing the luminance immediately after the manufacture in dependence upon the heating temperature four elements have been manufactured, the starting material being antimony trioxide. Heating was performed for the same period, i.e. 3 minutes, at different temperatures. Heating at a temperature of 720° C. provided a luminance of the element of 10.9 candela/m.$^2$, at 700° C. a luminance of 14 candela/m.$^2$, at a temperature of 680° C. a luminance of 10 candela/m.$^2$ and at a temperature of 660° C. a luminance of 7 candela/m.$^2$. The quantity of electroluminescent zinc sulphide was 97.5% by volume of the over-all volume of the electroluminescent layer.

In order to obtain an idea of the decay of the luminance an element with an electroluminescent layer was made on the basis of antimony trioxide, heated for 5 minutes at a temperature of 700° C., the percentage by volume of the electroluminescent, copper-activated zinc sulphide being 90. Immediately after the manufacture the brilliance of this element was 12.6 candela/m.$^2$ at 220 v., 50 c./s. After 25 hours burning at 220 v. and a frequency of 2000 c./s. the luminance was again measured at a frequency of 50 c./s. and 220 v. The brilliance was then 11.6 candela/m.$^2$, which means that the decay of the luminance was 8%. With a control-element in which the electroluminescent layer consisted of a known enamel with 40% by volume of the same electroluminescent substance the initial brilliance was 11.7 candela/m.$^2$ and after 25 hours of operation it was 7.5 candela/m.$^2$. The decay of the luminance was therefore about 36%.

The tests were then repeated under the same conditions with a different copper-activated zinc sulphide. There resulted for an element of a known enamel and 40% by volume of copper-activated zinc sulphide an initial value of 10.2 candela/m.$^2$ and after 100 hours of operation 6.3 candela/m.$^2$, which means a decay of 38%. An element according to the invention with the same copper-activated zinc sulphide and 95% by volume thereof in the electroluminescent layer had an initial luminance of 10.5 candela/m.$^2$ and after hours 9.1 candela/m.$^2$. The decay was therefore 12%. A further element according to the invention, having 97.5% by volume of the same electroluminescent substance had an initial value of 9.9 candela/m.$^2$ and after 100 hours a value of 9.0 candela/m.$^2$. The decay was consequently 9%.

The composition of the known enamel used in the tests mentioned above was:

| | Mol percent |
|---|---|
| $Na_2O$ | 9.4 |
| $Li_2O$ | 7.2 |
| $Ba_0$ | 6.1 |
| $ZnO$ | 25.4 |
| $Al_2O_3$ | 2.1 |
| $SiO_2$ | 17.6 |
| $TiO_2$ | 2.7 |
| $As_2O_3$ | 2.9 |
| $B_2O_3$ | 26.6 |

The drawing shows a cross-section through an electroluminescent element according to an embodiment of the invention. In this drawing 1 is a layer consisting of a solid dispersion of an electroluminescent substance in a glass-like medium. The layer 1 is sandwiched between the two electrodes 2 and 3 between which the voltage for operating the element is applied.

What is claimed is:
1. A method of manufacturing an electroluminescent layer for use in an electroluminescent element, said method comprising mixing finely divided grains of zinc sulfide electroluminescent phosphor with antimony trioxide, in amounts such that 60–98% by volume consists of the electroluminescent phosphor, heating the resultant mixture at a temperature above the melting point of the antimony trioxide for a period of about 3 to 8 minutes and then cooling said mixture.

2. The method of claim 1 wherein the mixture is heated at a temperature which exceeds by 20° C. to 60° C. the melting point of the antimony trioxide.

3. The method of claim 2 wherein the average size of the grains of the electroluminescent phosphor lies between 5 and 10μ.

4. An electroluminescent layer for use in an electroluminescent element said layer consisting essentially of a layer of antimony oxide in which there is dispersed finely divided grains of a zinc sulfide electroluminescent phosphor and from about 60 to 98% of the over-all volume of the layer consisting of the phosphor.

5. The electroluminescent layer of claim 4 wherein the antimony oxide is essentially antimony trioxide and the average grain size of the electroluminescent phosphor lies between about 5 and 10μ.

References Cited

UNITED STATES PATENTS 2,993,001   7/1961   Shonebarger _____ 252—301.6

TOBIAS E. LEVOW, *Primary Examiner.*

R. D. EDMONDS, *Assistant Examiner.*

U.S. Cl. X.R.

117—33.5; 313—108